(12) United States Patent
Xu et al.

(10) Patent No.: US 12,269,133 B2
(45) Date of Patent: Apr. 8, 2025

(54) METHOD OF MANUFACTURING BALL SCREW DEVICE

(71) Applicant: NSK Ltd., Tokyo (JP)

(72) Inventors: Wei Xu, Kanagawa (JP); Takayuki Yabe, Kanagawa (JP); Toshiaki Suzuki, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/285,118

(22) PCT Filed: Feb. 2, 2022

(86) PCT No.: PCT/JP2022/004006
§ 371 (c)(1),
(2) Date: Sep. 29, 2023

(87) PCT Pub. No.: WO2022/209260
PCT Pub. Date: Oct. 6, 2022

(65) Prior Publication Data
US 2024/0165753 A1    May 23, 2024

(30) Foreign Application Priority Data
Mar. 31, 2021  (JP) .................. 2021-060201

(51) Int. Cl.
*B23P 15/00*   (2006.01)
*B23P 21/00*   (2006.01)
(Continued)

(52) U.S. Cl.
CPC ............ *B23P 21/00* (2013.01); *B23P 15/003* (2013.01); *F16H 25/2204* (2013.01);
(Continued)

(58) Field of Classification Search
CPC ................ F16H 25/2204; F16H 25/24; Y10T 29/49641; Y10T 29/497; Y10T 29/49853; Y10T 74/19702; B23P 15/003
See application file for complete search history.

(56) References Cited

U.S. PATENT DOCUMENTS

| 5,644,951 A * | 7/1997 | Hatamura ............... F16H 25/24 |
| | | 74/89.42 |
| 2013/0145877 A1 * | 6/2013 | Horng .................... F16H 25/24 |
| | | 74/424.71 |

FOREIGN PATENT DOCUMENTS

| JP | 06-288458 A | 10/1994 |
| JP | 2004-114224 A | 4/2004 |

(Continued)

OTHER PUBLICATIONS

International Search Report for PCT/JP2022/004006 dated Apr. 5, 2022 [PCT/ISA/210].
(Continued)

*Primary Examiner* — Jermie E Cozart
(74) *Attorney, Agent, or Firm* — Sughrue Mion, PLLC

(57) ABSTRACT

A method of manufacturing a ball screw device includes a nut unit preparation step, a screw shaft preparation step, and an assembly step. In the nut unit preparation step, a nut unit is prepared in which a circulation component, a ball, and a temporary shaft that prevents the ball from falling off are assembled to a nut provided with an inner peripheral track surface. In the screw shaft preparation step, a screw shaft provided with an outer peripheral track surface is prepared. In the assembly step, after the nut unit preparation step and the screw shaft preparation step, the temporary shaft of an arbitrary nut unit is replaced with an arbitrary screw shaft to manufacture the ball screw device.

7 Claims, 6 Drawing Sheets

(51) Int. Cl.
*F16H 25/22* (2006.01)
*F16H 25/24* (2006.01)

(52) U.S. Cl.
CPC ........ *F16H 25/24* (2013.01); *Y10T 29/49641* (2015.01); *Y10T 29/497* (2015.01); *Y10T 29/49853* (2015.01); *Y10T 74/19702* (2015.01)

(56) References Cited

FOREIGN PATENT DOCUMENTS

| | | |
|---|---|---|
| JP | 2004-257466 A | 9/2004 |
| JP | 2006-007336 A | 1/2006 |
| JP | 2008-101694 A | 5/2008 |
| JP | 2010-032012 A | 2/2010 |
| JP | 2012-097807 A | 5/2012 |
| JP | 2015-232346 A | 12/2015 |
| JP | 2017-215005 A | 12/2017 |
| JP | 2019-105296 A | 6/2019 |

OTHER PUBLICATIONS

Office Action issued in Japanese Patent Application 2021-060201; dated Sep. 3, 2024.
Extended European Search Report issued Feb. 7, 2025, in corresponding European Patent Application No. 22779489.8.

* cited by examiner

METHOD OF MANUFACTURING BALL SCREW DEVICE

CROSS REFERENCE TO RELATED APPLICATION

This application is a National Stage of International Application No. PCT/JP2022/004006 filed Feb. 2, 2022, claiming priority based on Japanese Patent Application No. 2021-060201 filed Mar. 31, 2021.

FIELD

The present invention relates to a method of manufacturing a ball screw device.

BACKGROUND

A ball screw device is a device that converts a rotational motion into a linear motion or a linear motion into a rotational motion. As described in the following Patent Literature, a ball screw device includes a screw shaft, a nut penetrating the screw shaft, and a plurality of balls disposed between the screw shaft and the nut. Furthermore, the ball screw device has been shipped as a ball screw device after confirming that an axial gap and a preload defined in the standard are satisfied.

CITATION LIST

Patent Literature

Patent Literature 1: JP 2015-232346 A

SUMMARY

Technical Problem

Incidentally, manufacturing errors (variations) occur in the manufactured screw shaft and nut. Conventionally, in order to satisfy a predetermined gap or preload set for each product, adjustment is performed by stacking dimensions of three elements of a screw shaft, a nut, and a ball. In general, in a manufacturing process of a ball screw device, a screw shaft and a nut having a large manufacturing error are picked up, a ball diameter satisfying a standard axial gap or the like is selected, and a ball is filled in a track. That is, in the conventional manufacturing method, a ball screw device having a standard gap or preload is manufactured by combining a screw shaft and a nut, a ball selected, and these three elements as one set. Furthermore, in a case where one of the screw shaft and the nut of the ball screw device is damaged during the operation of the ball screw device and replaced with a new part instead of the damaged part (hereafter, reassembly), it is necessary to reselect the ball again in order to satisfy the axial gap or preload of the original standard. Therefore, assembling and reassembling of the ball screw device require a large amount of labor.

The present disclosure has been made in view of the above problems, and an object thereof is to provide a method of manufacturing a ball screw device capable of reducing labor during assembly and reassembly.

Solution to Problem

To achieve the above object, a method of manufacturing a ball screw device according to an embodiment is disclosed. The method includes a nut unit preparation step of preparing a nut unit in which a circulation component, a ball, and a temporary shaft that prevents the ball from falling off are assembled to a nut provided with an inner peripheral track surface, a screw shaft preparation step of preparing a screw shaft provided with an outer peripheral track surface, and an assembly step of replacing the temporary shaft of any of the nut units with any of the screw shafts to manufacture a ball screw device after the nut unit preparation step and the screw shaft preparation step.

The ball is assembled to the nut unit in advance. Therefore, it is possible to eliminate time and effort to select the ball having a diameter satisfying the standard in the assembly step. Furthermore, if a tolerance of a reference value of the track surface of the screw shaft and a tolerance of a reference value of a contact position of the nut unit with the track surface of the screw shaft are strictly managed, even if the ball screw device is assembled with the screw shaft and the nut unit arbitrarily selected (picked up) from a plurality of the screw shafts and the nut units, the assembled screw shaft device satisfies an axial gap according to the standard. Furthermore, even if the assembled screw shaft is damaged or replaced with a new screw shaft or nut unit, the axial gap of the standard is satisfied. Therefore, reassembly is facilitated.

As a desirable embodiment of the method of manufacturing a ball screw device, in the nut unit preparation step, a stopper that prevents the temporary shaft from falling off from the nut is attached to both end portions of the temporary shaft, or in the nut unit preparation step, in order to prevent the temporary shaft from falling off from the nut, the nut unit is covered with a packing material.

According to the above configuration, it is possible to prevent the temporary shaft from falling off in a process of conveying the nut unit.

In the method of manufacturing a ball screw device, in the ball screw device, an axial gap between the screw shaft and the nut unit is 0.05 mm or less. Or, in the ball screw device, an axial gap between the screw shaft and the nut unit is 0.02 mm or less. Or, in the ball screw device, an axial gap between the screw shaft and the nut unit is 0.005 mm or less. Or, in the ball screw device, an axial gap between the screw shaft and the nut unit is 0 mm or less.

Advantageous Effects of Invention

According to the method of manufacturing the ball screw device of the present disclosure, it is possible to reduce labor during assembly and reassembly. Furthermore, since the screw shaft and the nut unit can be arbitrarily combined, the screw shaft and the nut unit can be easily assembled regardless of a place, timing, and a worker. Moreover, since no adjustment is required, assembly on an automatic production line can be easily realized.

DESCRIPTION OF EMBODIMENTS

Hereinafter, the present invention will be described in detail with reference to the drawings. Note that the present invention is not limited by a mode for carrying out the following invention (hereinafter, referred to as an embodiment). Furthermore, constituent elements in the following embodiments include those that can be easily assumed by those skilled in the art, those that are substantially the same, and those within a so-called equivalent range. Moreover, the constitution elements disclosed in the following embodiments can be appropriately combined.

Figure 1:
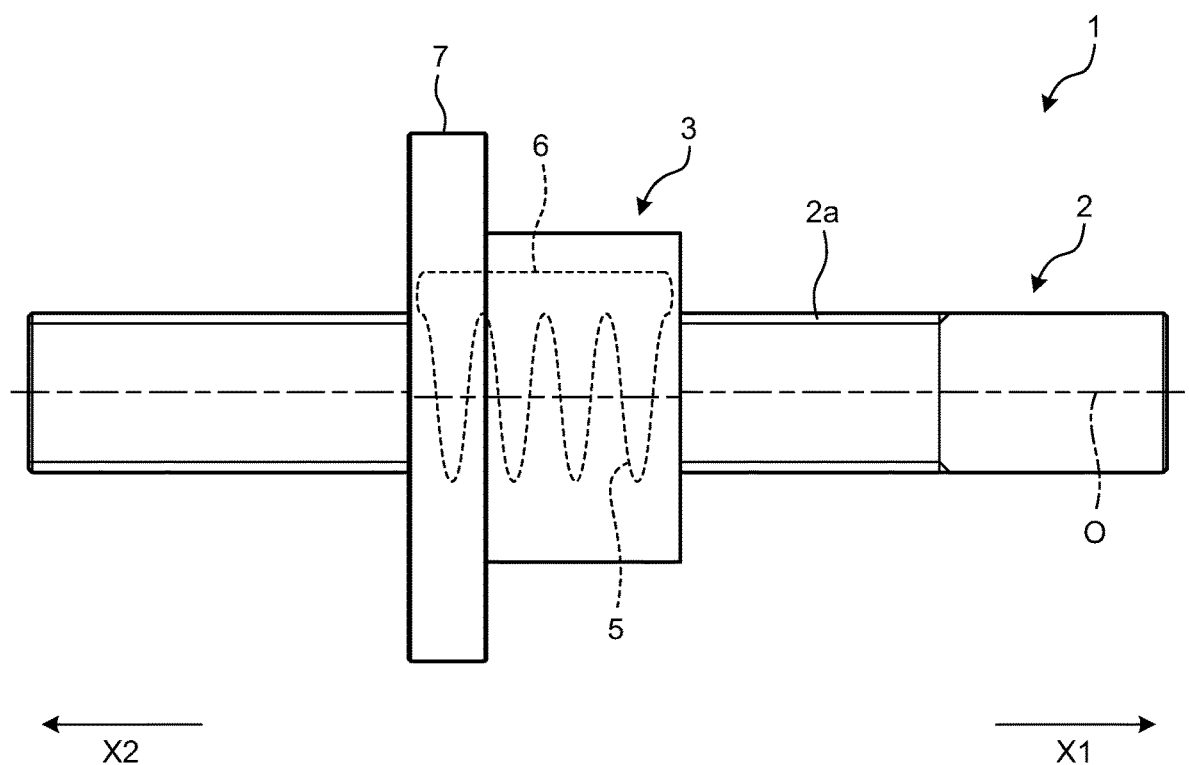
FIG. 1 is an overall diagram of a ball screw device according to an embodiment.
Figure 2:
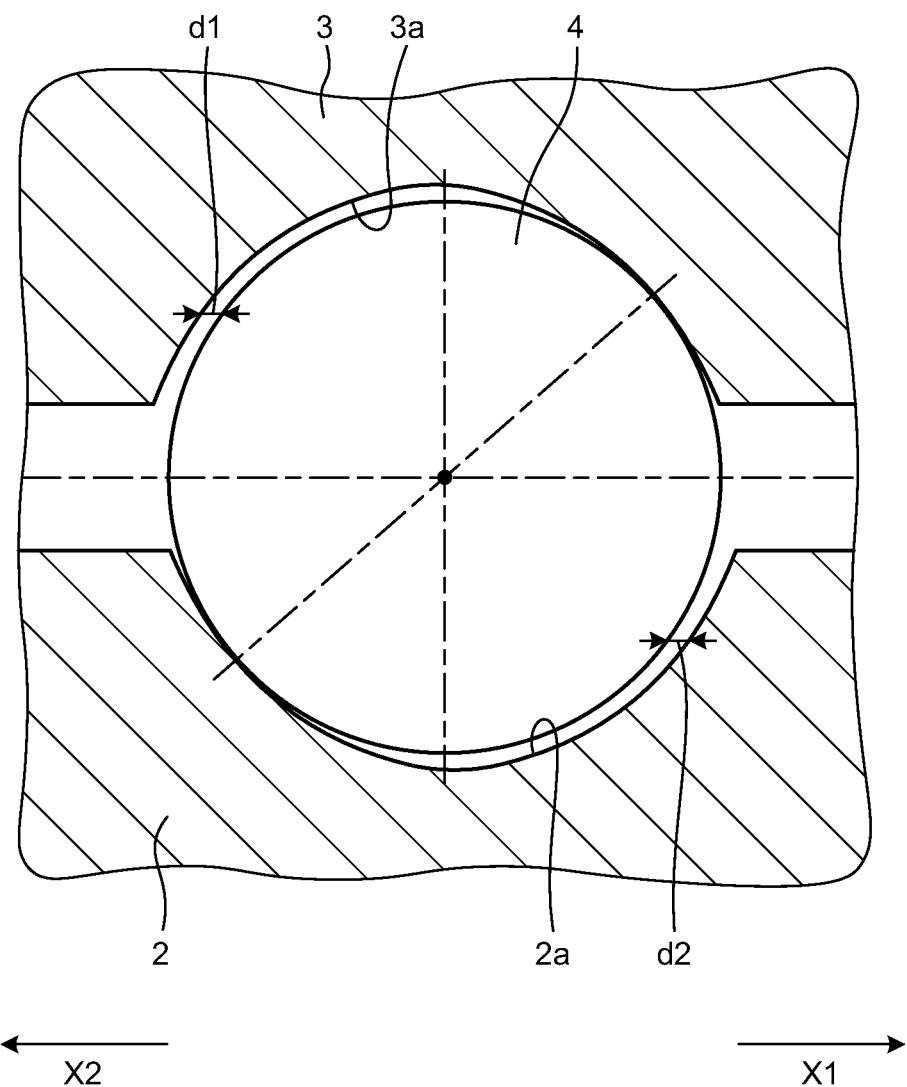
FIG. 2 is a cross-sectional view illustrating an arrangement state of a ball of the ball screw device of the embodiment.
Figure 3:
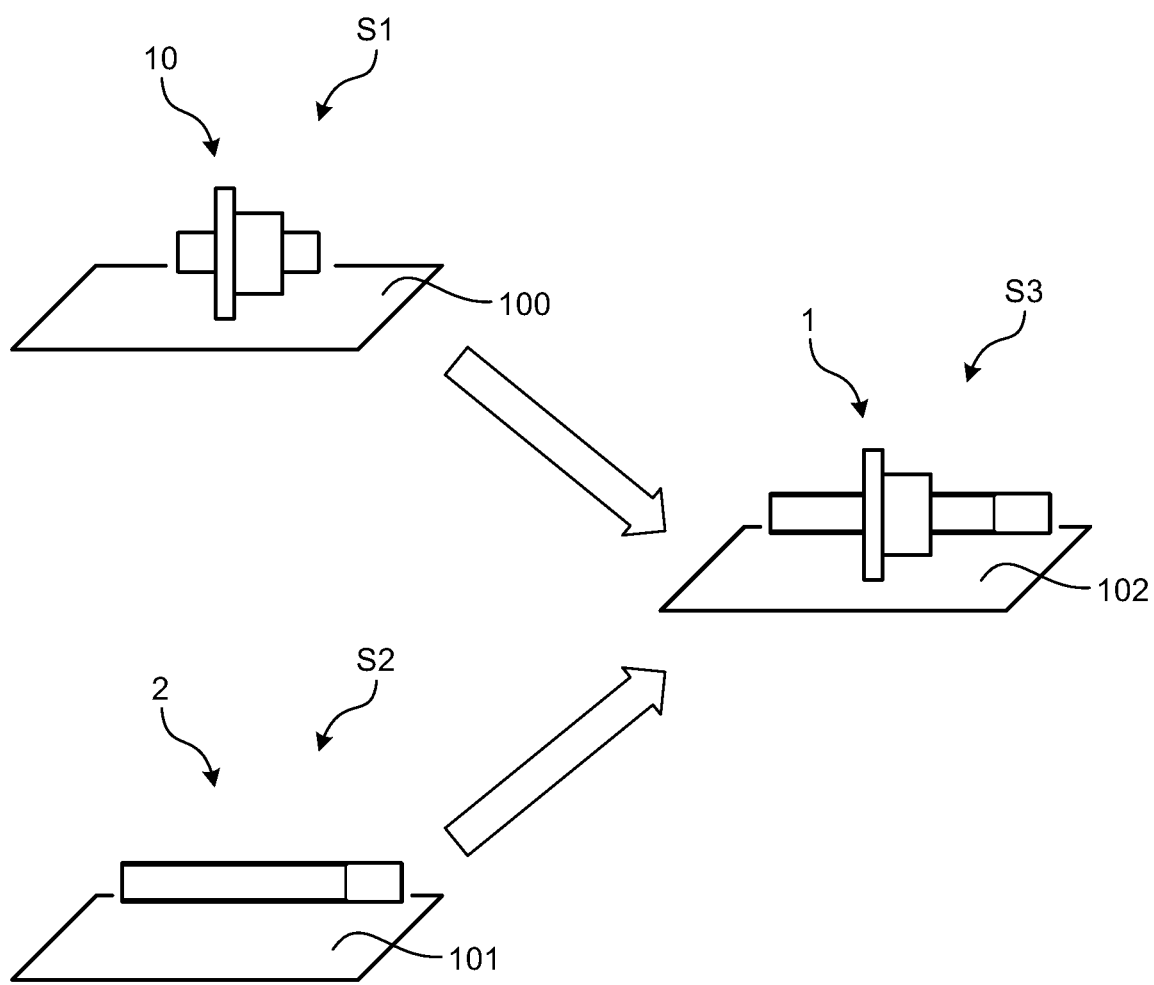
FIG. 3 is an explanatory diagram illustrating each step included in the method of manufacturing the ball screw device of the embodiment.
Figure 4:
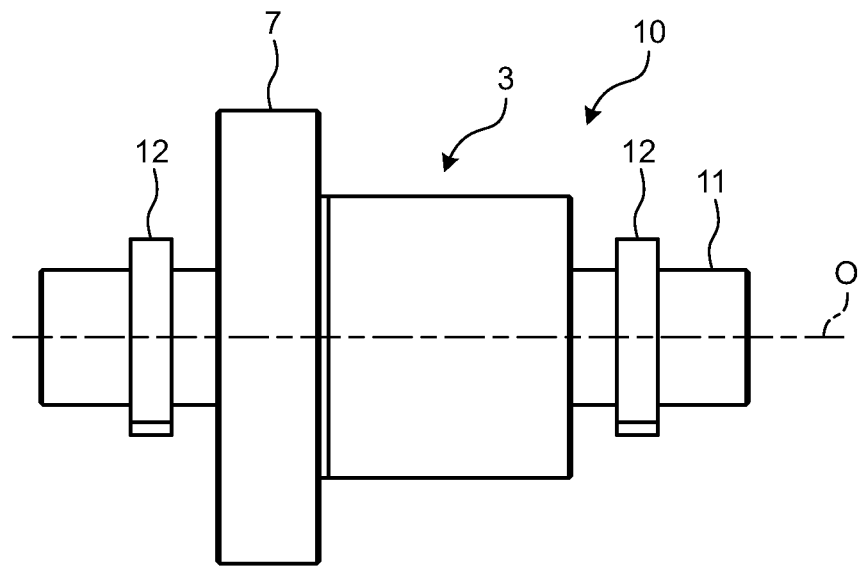
FIG. 4 is an overall diagram of a nut unit manufactured in a nut unit preparation step of the embodiment.
Figure 5:
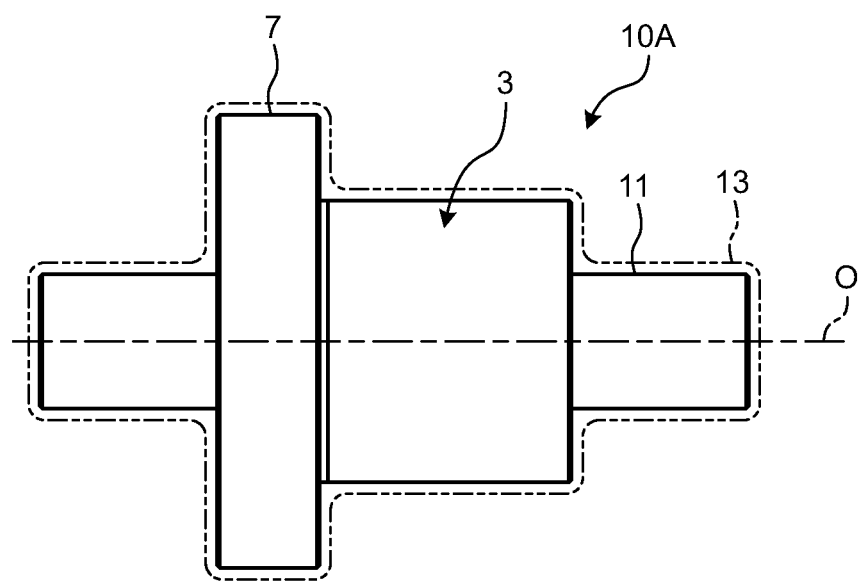
FIG. 5 is an overall diagram of a nut unit manufactured in a nut unit preparation step according to a first modification.
Figure 6:
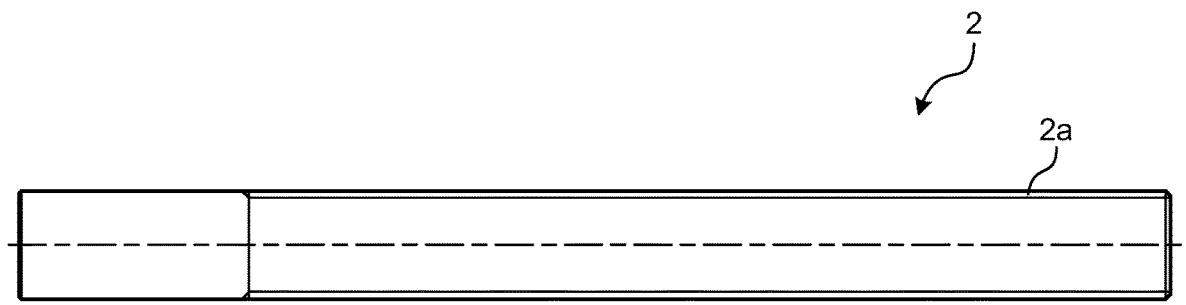
FIG. 6 is an overall diagram of a screw shaft prepared in a screw shaft preparation step according to the embodiment.
Figure 7:
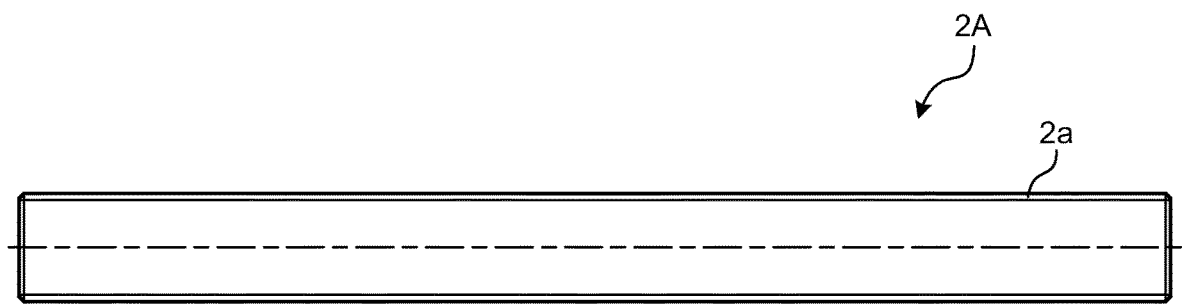
FIG. 7 is an overall view of a screw shaft prepared in a screw shaft preparation step according to a first modification.
Figure 8:
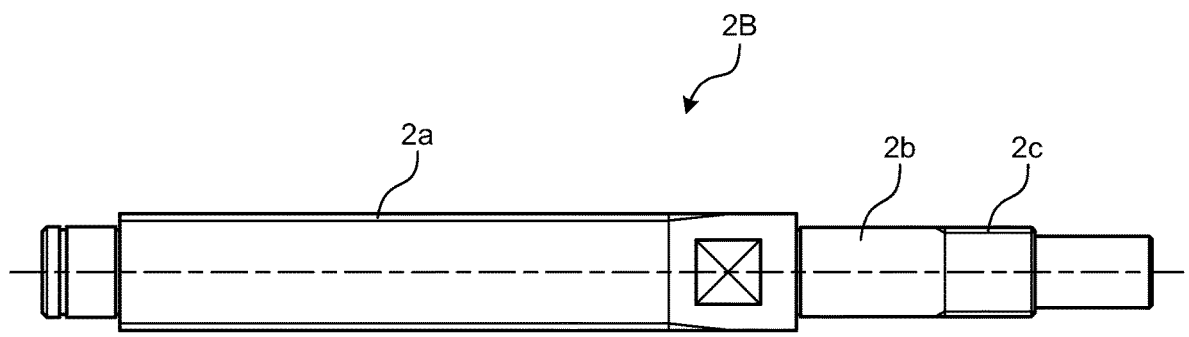
FIG. 8 is an overall diagram of a screw shaft prepared in a screw shaft preparation step according to a second modification.
Figure 9:
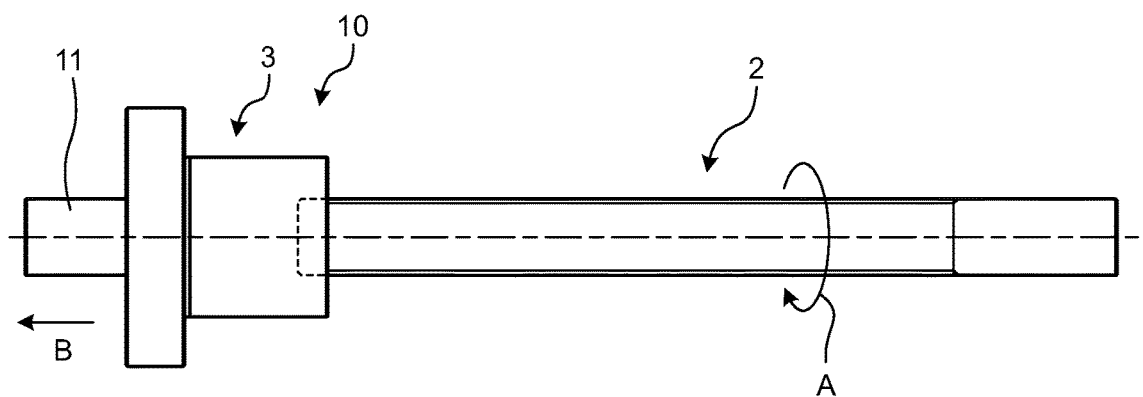
FIG. 9 is a diagram illustrating a state in which a screw shaft is inserted into a nut in an assembly step.

FIG. 1 is an overall diagram of a ball screw device according to an embodiment. FIG. 2 is a cross-sectional view illustrating an arrangement state of a ball of the ball screw device of the embodiment. FIG. 3 is an explanatory diagram illustrating each step included in a method of manufacturing the ball screw device of the embodiment. FIG. 4 is an overall diagram of a nut unit manufactured in a nut unit preparation step of the embodiment. FIG. 5 is an overall diagram of a nut unit manufactured in a nut unit preparation step according to a first modification. FIG. 6 is an overall diagram of a screw shaft prepared in a screw shaft preparation step according to the embodiment. FIG. 7 is an overall diagram of a screw shaft prepared in a screw shaft preparation step according to a first modification. FIG. 8 is an overall diagram of a screw shaft prepared in a screw shaft preparation step according to a second modification. FIG. 9 is a diagram illustrating a state in which a screw shaft is inserted into a nut in an assembly step.

As illustrated in FIG. 1, a ball screw device 1 includes a screw shaft 2, a nut 3, and a plurality of balls 4 (see FIG. 2). The screw shaft 2 is a shaft member, and has a spiral outer peripheral track surface 2a on an outer peripheral surface (see FIG. 6). In the following description, a direction parallel to a central axis O of the screw shaft 2 is referred to as an axial direction. The outer peripheral track surface 2a is provided not on the entirety of the screw shaft 2 in the axial direction, but only on a part of the screw shaft.

The nut 3 is a cylindrical component, and has a spiral inner peripheral track surface 3a on an inner peripheral surface. The outer peripheral track surface 2a and the inner peripheral track surface 3a are the same lead and face each other. Therefore, a spiral track 5 is provided between the outer peripheral track surface 2a and the inner peripheral track surface 3a.

The nut 3 includes a return path 6 extending in the axial direction. Furthermore, the nut 3 includes two deflectors (not illustrated). The deflectors scoop up the balls 4 from a terminal end of the track 5 and guide the balls 4 to the return path 6, and supply the balls from the return path 6 to a starting end of the track 5. Note that, in the ball screw device of the present disclosure, the deflectors are exemplified as an example of a circulation component. However, other than the deflectors, a tube, a top, an end cap, and other circulation systems may be used, and there is no particular limitation.

A flange 7 for fixing the nut 3 to another component is provided at one end portion in the axial direction on the outer peripheral surface of the nut 3. In the embodiment, a flanged nut is cited as an example of the nut, but the present disclosure may be other nuts such as a non-flanged nut, a square nut, and a trunnion nut, and is not particularly limited. Hereinafter, a direction in which the flange 7 is disposed as viewed from a central portion of the nut 3 in the axial direction is referred to as a first direction X1, and a direction opposite to the first direction is referred to as a second direction X2.

FIG. 2 illustrates a cross section of the track 5. The balls 4 are spherical rolling bodies. Each of the balls 4 is disposed on the track 5 between the outer peripheral track surface 2a and the inner peripheral track surface 3a. In the present embodiment, an axial gap is 0.05 mm or less. Note that the axial gap is a distance by which one of the screw shaft 2 and the nut 3 is fixed and the other of the screw shaft 2 and the nut 3 is movable in the axial direction without rotating. That is, the axial gap is a gap amount obtained by adding a gap d1 between a rolling surface of the ball 4 and the inner peripheral track surface 3a and a gap d2 between the rolling surface of the ball 4 and the outer peripheral track surface 2a. Furthermore, the axial gap also includes a state in which the track surface (2a, 3a) and the ball 4 are in contact with each other and a preload is applied (a state in which the gap amount is negative), in addition to the case where there is a gap between the track surface (2a, 3a) and the ball 4.

As illustrated in FIG. 3, the method of manufacturing the ball screw device 1 includes a nut unit preparation step S1, a screw shaft preparation step S2, and an assembly step S3. The assembly step S3 is performed after the nut unit preparation step S1 and the screw shaft preparation step S2. Furthermore, in the order of the nut unit preparation step S1 and the screw shaft preparation step S2, either step may be performed first, or both steps may be performed simultaneously.

The nut unit preparation step S1 is a step of preparing a nut unit 10. As illustrated in FIG. 4, the nut unit 10 is formed by assembling and integrating the nut 3, the ball 4 (not illustrated), the circulation component (not illustrated), and a temporary shaft 11. In the nut unit preparation step S1 of the present embodiment, first, the nut 3, the ball 4 (not illustrated), the circulation component (not illustrated), and the temporary shaft 11 are prepared. Note that the temporary shaft 11 is a cylindrical component.

In the nut unit preparation step S1, with respect to the nut 3 and the ball 4 to be prepared, a reference value of a state in which the ball 4 is inserted into the track surface 3a of the nut 3 is set in advance, and it has been confirmed by inspection that a manufacturing error (variation) of the nut and the ball is within a predetermined control range. Here, the control range with respect to the predetermined reference value is controlled within a range stricter than the tolerance, in other words, the reference value is set in advance as a constant, and an allowable range is controlled within a range narrower than the tolerance. As a result, the axial gap in the standard set by the ball screw device 1 which is a finished product is satisfied. Furthermore, for example, a method of measuring a ball center diameter (BCD) and determining the BCD together with a diameter of the inserted ball can be cited to confirm whether or not it is within the range of control with respect to the predetermined reference value. Alternatively, there is a method in which a master screw shaft serving as a master is assembled to a nut and a ball, the nut is fixed, and a moving distance (axial gap) in the axial direction is measured without the master screw shaft rotating.

In the nut unit preparation step S1, after preparing each component, the nut unit 10 is assembled next. To assemble the nut unit 10, a circulation component is assembled to the nut 3. Next, the temporary shaft 11 is inserted into the nut 3. As a result, the inner peripheral track surface 3a of the nut 3 faces the outer peripheral surface of the temporary shaft 11. Furthermore, the temporary shaft 11 is inserted into such an extent as not to cover a part of the inner peripheral track surface 3a, and a portion to be filled with the ball 4 is left open. Next, the ball 4 is inserted between the inner peripheral track surface 3a of the nut 3 and the outer peripheral surface of the temporary shaft 11, and the inner peripheral track surface 3a and the return path are filled with the ball 4. Next, the temporary shaft 11 is further pushed, and the temporary shaft 11 penetrates the nut 3. According to this, the ball 4 abuts on the outer peripheral surface of the temporary shaft 11, and the ball filled in the nut does not fall off from the inner peripheral track surface. Then, the completed nut unit 10 is conveyed from a site 100 on which the nut unit preparation step S1 is performed to a site 102 on which the assembly step S3 is performed, and this step ends. Note that, although the nut unit preparation step S1 of the present embodiment manufactures the nut unit 10 in the site 100, the nut unit preparation step S1 of the present disclosure is not limited to the case of actually manufacturing the nut unit 10. That is, the nut unit preparation step S1 of the present disclosure includes a case where the nut unit 10 itself is purchased or imported from another country, and the nut unit 10 is carried into the site 100 and prepared.

Note that, in the present embodiment, stoppers 12 are fitted to both end portions of the temporary shaft 11 at the time of assembling the nut unit 10. Each of the stoppers 12 is an annular component and is made of an elastic material. As a result, even if the temporary shaft 11 moves in the axial direction during the conveyance of the nut unit 10, the stopper abuts on an end surface of the nut, and the temporary shaft is prevented from falling off from the nut. Furthermore, the nut unit 10 of the present embodiment may be packed with a bag-shaped packing material 13 as illustrated in FIG. 5 instead of the stopper 12. Note that, in the manufacturing method of the present disclosure, the stopper 12 and the packing material 13 are not essential, and the nut unit 10 may be conveyed as it is.

The screw shaft preparation step S2 is a step of setting a reference value, which is a constant, in advance on the track surface 2a of the screw shaft 2, confirming whether or not the manufacturing error (variation) is within a predetermined control range, and preparing the screw shaft 2 satisfying a requirement of the control range. Whether or not the manufacturing error is within the control range with respect to a predetermined reference value can be determined by a method in which a master nut serving as a master is assembled to a screw shaft, the nut is fixed, and a moving distance (axial gap) of the master screw shaft in the axial direction is measured. Furthermore, there is a method of measuring a screw groove and making a determination by assuming a ball center diameter (BCD). Furthermore, the screw shaft 2 satisfying the predetermined control range is conveyed from a site 101 where the screw shaft preparation step S2 is performed to the site 102 where the assembly step S3 is performed, and this step ends.

Note that, in the screw shaft 2 described in the embodiment, as illustrated in FIG. 6, the outer peripheral track surface 2a is provided in a part of the screw shaft 2 in the axial direction, but the present disclosure is not limited thereto. For example, as illustrated in FIG. 7, a screw shaft 2A may be provided with the entire outer peripheral track surface 2a in the axial direction. Alternatively, as illustrated in FIG. 8, the screw shaft may be a screw shaft 2B including the outer peripheral track surface 2a, a fixing surface 2b for fixing the screw shaft 2B to another component, a male screw portion 2c, and all or a part of another machined portion. Note that, the fixing surface 2b is a surface to which a component that moves in the axial direction together with the screw shaft 2B is fitted. Then, a nut screwed to the male screw portion 2c prevents a component fitted to the fixing surface 2b from falling off. Furthermore, in the screw shaft preparation step S2 of the present disclosure, the screw shaft 2 prepared in the site 101 may be manufactured in the site 101. Alternatively, the screw shaft 2 may be a screw shaft carried into the site 101 from a place other than the site 101 by purchase (including import from another country), and is not particularly limited.

The assembly step S3 is a step of assembling the ball screw device 1 by combining the nut unit 10 and the screw shaft 2 in the site 102. In the combination method, as illustrated in FIG. 9, one nut unit 10 is arbitrarily picked up (selected) from a plurality of the nut units 10 manufactured with a predetermined reference value and a control range thereof, and the stopper 12 or the packing material 13 are removed. Similarly, an end portion of one screw shaft 2 arbitrarily picked up (selected) from a plurality of the screw shafts 2 manufactured with a predetermined reference value and a control range thereof is inserted. Then, the nut 3 is fixed, and the screw shaft 2 is rotated as indicated by an arrow A in FIG. 9. As a result, the ball 4 filled in the nut 3 enters the outer peripheral track surface 2a of the screw shaft 2, and the screw shaft 2 gradually enters the nut 3. As a result, the temporary shaft 11 is pushed out by the screw shaft (see an arrow B in FIG. 9). Then, when the screw shaft 2 is rotated to such an extent that the screw shaft 2 penetrates the nut 3, the assembly of the ball screw device 1 is completed, and the assembly step S3 ends.

As described above, the method of manufacturing the ball screw device of the embodiment includes the nut unit preparation step S1, the screw shaft preparation step S2, and the assembly step S3. In the nut unit preparation step S1, the circulation component, the ball 4, and the temporary shaft 11 that prevents the ball 4 from falling off are assembled to the nut 3 provided with the inner peripheral track surface 3a to manufacture the nut unit 10. In the screw shaft preparation step S2, the screw shaft 2 provided with the outer peripheral track surface 2a is prepared. In the assembly step S3, after the nut unit preparation step S1 and the screw shaft preparation step S2, the temporary shaft 11 of an arbitrary nut unit 10 manufactured with a predetermined reference value and its control range is replaced with an arbitrary screw shaft 2 manufactured with a predetermined reference value and its control range, thereby manufacturing the ball screw device 1.

According to the manufacturing method of the embodiment, it is controlled whether or not the ball center diameters of the track surface 2a of the screw shaft 2 and the track surface of the nut unit 10 are within the control range from the set value according to the predetermined standard, and the assembled ball screw device 1 is also assembled by picking up the screw shaft 2 and the nut unit 10 having the same set value, so that the axial gap according to the standard is satisfied. Furthermore, in a case where the assembled screw shaft 2 or nut unit 10 is damaged, even if the screw shaft 2 or nut unit is replaced with a new screw shaft 2 or nut unit of the same standard, the axial gap of a predetermined standard is satisfied, and reassembly is facilitated. Furthermore, since the ball 4 is assembled to the nut unit 10 in advance, it is possible to eliminate time and effort of adjusting the ball diameter satisfying the standard in the assembly step. Furthermore, in the assembly step, the screw shaft 2 and the nut unit 10 of the same standard can be arbitrarily assembled, and time and effort of selecting and adjusting the combination of the screw shaft 2 and the nut unit 10 can also be eliminated. Moreover, automation of the assembly can be easily realized.

Furthermore, in the nut unit preparation step S1 of the embodiment, the stoppers 12 for preventing the temporary shaft 11 from falling off from the nut 3 are attached to both end portions of the temporary shaft 11. Alternatively, as in a first modification, in the nut unit preparation step S1, the nut unit is covered with the packing material 13 in order to prevent the temporary shaft 11 from falling off from the nut 3.

Accordingly, when the nut unit 10 is conveyed from the site 100 to the site 102, the temporary shaft 11 is prevented from falling off.

Although the embodiment has been described above, the axial gap is 0.05 mm or less for the standard setting of the ball screw device 1 manufactured in the embodiment, the ball screw device of the present disclosure is not limited to one having the axial gap of 0.05 mm or less. Therefore, the axial gap may exceed 0.05 mm. On the other hand, in consideration of the practicality of the precision grade ball screw, the ball screw device of the present disclosure may be a ball screw device in which the standard of the axial gap is 0.05 mm or less, 0.02 mm or less, or 0.005 mm or less, or a preload is applied (the axial gap is 0 mm or less), and can be applied according to the grade of the ball screw device.

Furthermore, the sites 100, 101, and 102 where each step is performed may refer to different places in the same factory, or may refer to separate factories far from each other, and are not particularly limited. Moreover, the site 102 is not necessarily limited to a site owned by a manufacturing side, and may be on a site of an agent, a processing site, a user, or another side. Furthermore, in the present disclosure, the nut unit preparation step S1, the screw shaft preparation step S2, and the assembly step S3 may be the same site. That is, the nut unit preparation step S1 and the screw shaft preparation step S2 may be performed on the site 102 where the assembly step S3 is performed. In other words, in the nut unit preparation step S1, the nut unit 10 manufactured in a country A may be imported and carried into the site 102 where the assembly step S3 is performed to prepare the nut unit 10. Similarly, in the screw shaft preparation step S2, the screw shaft 2 manufactured in a country B may be imported and carried into the site 102 where the assembly step S3 is performed to prepare the screw shaft 2.

REFERENCE SIGNS LIST

1 BALL SCREW DEVICE
2, 2A, 2B SCREW SHAFT
2a OUTER PERIPHERAL TRACK SURFACE
3 NUT
3a INNER PERIPHERAL TRACK SURFACE
4 BALL
10 NUT UNIT
11 TEMPORARY SHAFT
12 STOPPER
13 PACKING MATERIAL
S1 NUT UNIT PREPARATION STEP
S2 SCREW SHAFT PREPARATION STEP
S3 ASSEMBLY STEP

The invention claimed is:

1. A method of manufacturing a ball screw device, the method comprising:
a nut unit preparation step of preparing a nut unit in which a ball, and a temporary shaft that prevents the ball from falling off are assembled to a nut provided with an inner peripheral track surface;
a screw shaft preparation step of preparing a screw shaft provided with an outer peripheral track surface; and
an assembly step of replacing the temporary shaft of the nut unit with the screw shaft to manufacture a ball screw device after the nut unit preparation step and the screw shaft preparation step,
wherein the nut unit preparation step includes a measurement step of measuring a moving distance, when the ball and a master screw shaft that is a reference are assembled to the nut such that the master screw shaft is moved in an axial direction without rotating while the nut is fixed, and
the screw shaft preparation step includes a measurement step of measuring a moving distance, when a master nut that is a reference is assembled to the screw shaft such that the screw shaft is moved in the axial direction without rotating while the master nut is fixed.

2. The method of manufacturing a ball screw device according to claim 1, wherein
in the nut unit preparation step, a stopper that prevents the temporary shaft from falling off from the nut is attached to both end portions of the temporary shaft.

3. The method of manufacturing a ball screw device according to claim 1, wherein
in the nut unit preparation step, in order to prevent the temporary shaft from falling off from the nut, the nut unit is covered with a packing material.

4. The method of manufacturing a ball screw device according to claim 1, wherein
in the ball screw device, an axial gap between the screw shaft and the nut unit is 0.05 mm or less.

5. The method of manufacturing a ball screw device according to claim 1, wherein
in the ball screw device, an axial gap between the screw shaft and the nut unit is 0.02 mm or less.

6. The method of manufacturing a ball screw device according to claim 1, wherein
in the ball screw device, an axial gap between the screw shaft and the nut unit is 0.005 mm or less.

7. The method of manufacturing a ball screw device according to claim 1, wherein
in the ball screw device, an axial gap between the screw shaft and the nut unit is 0 mm or less.

* * * * *